United States Patent [19]

Artigue et al.

[11] Patent Number: 4,600,067
[45] Date of Patent: Jul. 15, 1986

[54] WEIGHING APPARATUS WITH ADDITIONAL ASSEMBLY FOR TORSION COMPENSATION

[76] Inventors: Francis Artigue, 21, chemin des Justices, F-91370 Verrieres le Buisson; Roland Cormier, 40, avenue Herbillon, F-94260 Saint Mande; Christian Francois, 96, rue de Tolbiac, F-75013 Paris, all of France

[21] Appl. No.: 635,744
[22] PCT Filed: Nov. 29, 1983
[86] PCT No.: PCT/FR83/00238
 § 371 Date: Jul. 30, 1984
 § 102(e) Date: Jul. 30, 1984
[87] PCT Pub. No.: WO84/02186
 PCT Pub. Date: Jun. 7, 1984

[30] Foreign Application Priority Data

Nov. 30, 1982 [FR] France ................ 82 20040

[51] Int. Cl.⁴ .............. G01G 3/14; G01G 3/08; G01G 23/10
[52] U.S. Cl. ..................... 177/211; 177/185; 177/229
[58] Field of Search ............ 177/185, 211, 229

[56] References Cited

U.S. PATENT DOCUMENTS

| | | | |
|---|---|---|---|
| 2,597,751 | 5/1952 | Ruge | 177/211 X |
| 3,707,076 | 12/1972 | Jones | 177/211 X |
| 3,968,683 | 7/1976 | Ormond | 177/211 X |
| 4,380,175 | 4/1983 | Griffen | 177/211 X |
| 4,453,609 | 6/1984 | Griffen et al. | 177/211 |

FOREIGN PATENT DOCUMENTS 35202 3/1980 Japan .................. 177/211

Primary Examiner—E. A. Goldberg
Assistant Examiner—Patrick W. Foster
Attorney, Agent, or Firm—Peter L. Berger

[57] ABSTRACT

A weight scale in particular a bath room scale contains strain gauges. To make the scale of simple design while being reliable and precise a single bar has at its ends a load receiving plate and support base. At least two strain gauges are fastened to the bar and are sensitive to bending of the bar. At least one another strain gauge is fastened to the bar, this being sensitive to twisting of the bar.

32 Claims, 7 Drawing Figures

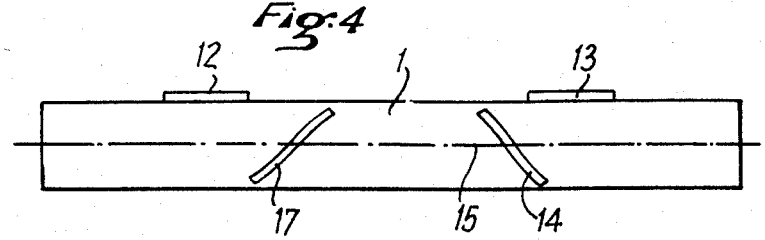
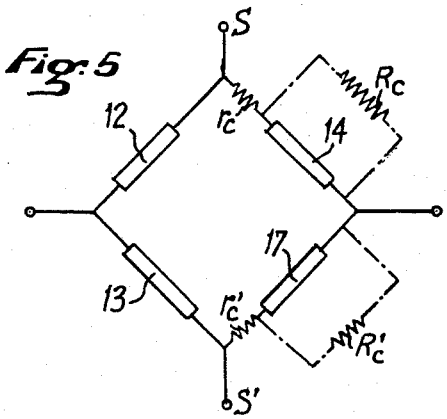
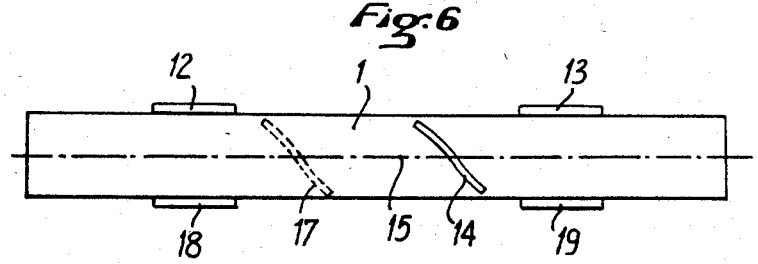
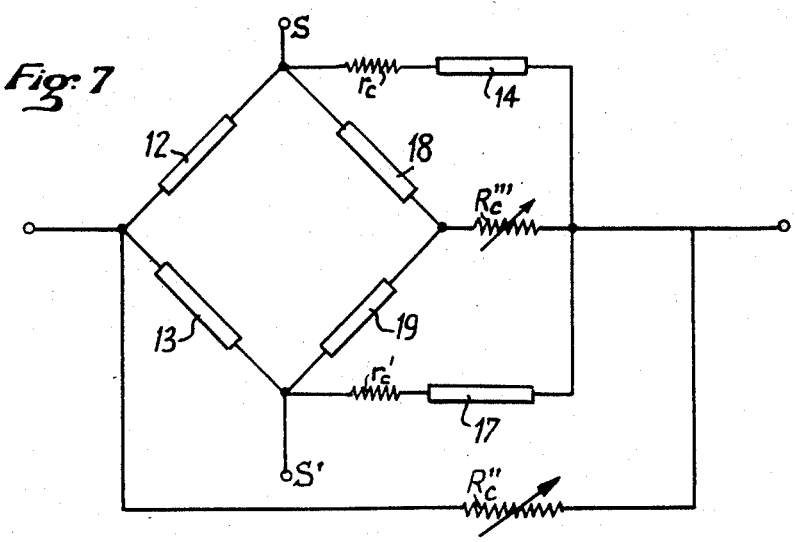

WEIGHING APPARATUS WITH ADDITIONAL ASSEMBLY FOR TORSION COMPENSATION

BACKGROUND OF THE INVENTION

The invention concerns weighing apparatus of the type having strain guages, and it is particularly applicable to bathroom scales.

It is intended that such apparatus which, while being of a simple design, structure and low-cost is nevertheless reliable and precise.

For this purpose, the apparatus of the invention comprises a single bar integrated at its ends with a load receiving plate and with a support base respectively; at least two assemblies with strain gauges fastened to the bar sensitive to bending of the bar under the effect of the load applied, those assemblies, in combination with the zone of the bar with which they work and with a circuit to process the signals emitted by the gauges having the same measurement sensitivity for the same load applied. The apparatus further comprises at least a third assembly with a strain gauge fastened to the bar sensitive to twisting of the bar under the effect of the load applied and a circuit to process the signals emitted by the three strain gauge assemblies, further including means for combining the signals so as to eliminate in the outgoing signal the component resulting from strain of the bar in torsion.

The first two bending-sensitive assemblies contain identical gauges working together with the bar in zones of the same section.

Outside of the zones of measurement of the bending movement, the bar can be of variable section and/or composition, notably, at its fastening end or in the zone receiving the torsion-sensitive assembly.

Preferably, however, the bar is of uniform section, e.g., polygonal (square, rectangular, etc.) or curved (round, elliptical, etc.) or profiled (T, U, I, H, [, L, etc.). The bar can be solid or tubular.

According to one preferred embodiment, each assembly contains a single gauge, the gauge of each assembly sensitive to bending being parallel to the general direction of the bar and the gauge of the assembly sensitive to twisting being inclined in that direction, e.g., by 45°.

In practice, each of the three strain gauge assemblies is sensitive to both bending and twisting, but for different parts, so that, by elimination of the twisting component in the outgoing signal, the bending component forming that outgoing signal is essentially defined by the two bending-sensitive components and, for a small part, the by twisting-sensitive component.

BRIEF DESCRIPTION OF THE DRAWINGS

FIG. 4 is a partial vertical sectional view similar to FIG. 1 showing a bar equipped with strain gauges according to another embodiment.

FIG. 5 is a schematic view of the extensometric bridge formed by the gauges of FIG. 4; and FIGS. 6 and 7 are views analogous to FIGS. 4 and 5, respectively, showing another embodiment of this invention.

DETAILED DESCRIPTION

Figure 1:
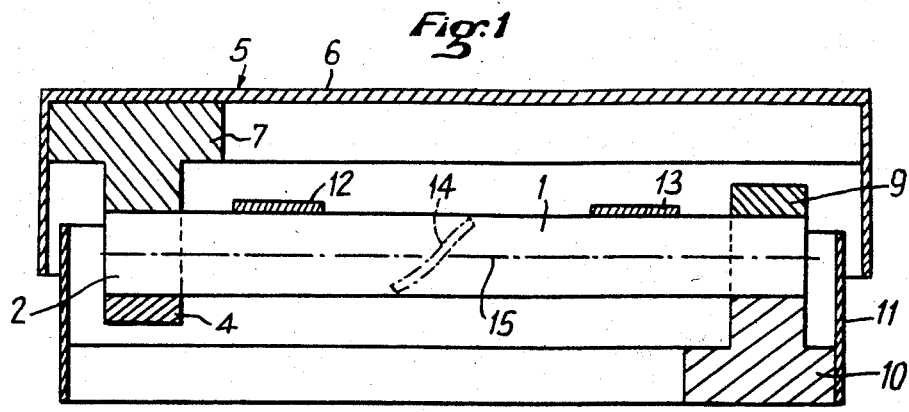
FIG. 1 is a vertical sectional view of the apparatus of the invention.
Figure 2:
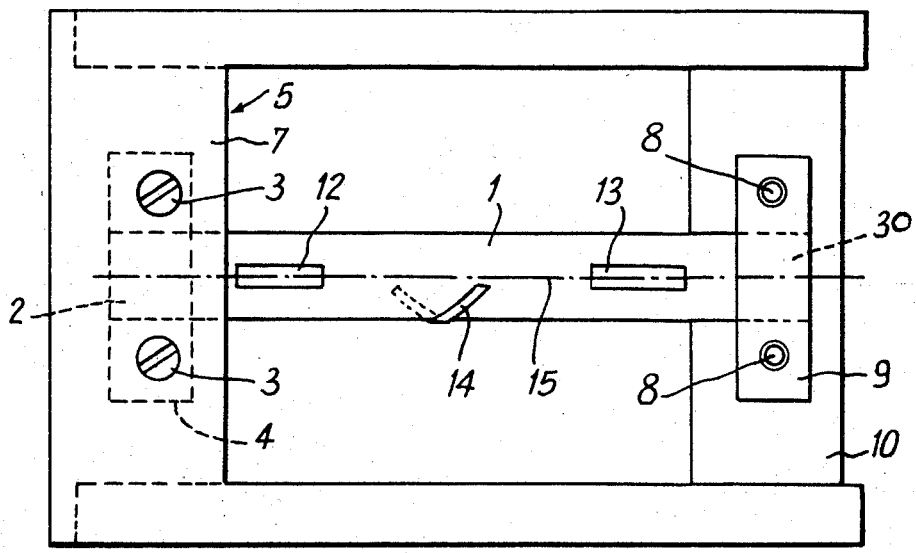
FIG. 2 is a plan view of the apparatus of FIG. 1.

The weighing apparatus, notably, a bathroom scale, shown in FIGS. 1 and 2, contains a sensitive element 1 formed by a single cylindrical bar of uniform cross-section. Preferably, as illustrated, the bar 1 is of circular cross-section, but that section could be of another curved shape, e.g., elliptical or even polygonal, such as square or rectangular, or even profiled (T, H, I, U, [, L, etc.).

At one end 2, the bar 1 is integrally connected to a load support plate 5 by fastening a screw 3 through a clamp 4 to hold load support plate 5. This support plate may comprise an upper plate 6 and a fork- or frame-shaped supporting structure 7, to which the plate 6 is attached and which is directly connected on the end 2.

At its other end 3, the bar 1 is integrally connected with a base 10 by fastening a screw 8 through a clamp 9 to base 10, whereby the weighing apparatus may rest on a support, such as the floor. The base 10 may have a lateral fitting 11, the upper edge of which is overhung by a lateral peripheral skirt of the plate 6. The base 10 may also be fork- or frame-shaped in order to provide a stable bearing.

The plate 6 and the fitting 11 have been deleted from FIG. 2 for sake of clarity of the drawing.

The bar 1 is generally horizontal, as are the support structure 7 and the base 10. The bar 1 can extend parallel to one side of the machine or, if necessary, along a diagonal or even along a diameter, if the apparatus is circular.

When a load to be weighed is placed on the plate 6, it subjects the bar 1 to bending and possibly twisting or torsion stresses. To measure those stresses, there are attached to the bar 1, generally by gluing, at least two longitudinal strain gauges 12 and 13 and at least one strain gauge 14, shown in dotted and dashed lines on FIG. 1, the direction of which is inclined on the longitudinal axis 15 of the bar. Preferably, the two longitudinal gauges 12 and 13 are on the same generatrix, e.g., on the upper or lower generatrix, and gauge 14 is tilted by 45° on the axis 15 of the bar, so as to have maximum twisting sensitivity.

If the load to be weighed is perpendicular to the axis 15, the latter works only in flexion, while if the load is off-center, the bar works in flexion and in torsion. In that case, the strain of the bar in torsion also acts on the longitudinal gauges 12 and 13, which then run the risk of distorting the measurement. The inclined gauge 14 is mainly sensitive to twisting and, to a lesser extent, to bending. Its function is to cancel the part of the signal of the longitudinal gauges 12 and 13 occasioned by twisting.

Figure 3:
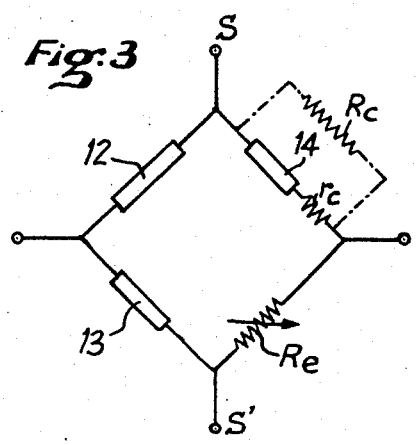
FIG. 3 is a schematic view of an extensometric bridge formed by the gauges of the apparatus of FIGS. 1 and 2.

The signals are treated by means of the extensometric bridge of FIG. 3. The gauges 12 and 13 are mounted in series. The terminals of the series circuit are connected to the terminals S and S', respectively, of the power supply in parallel on that series circuit. A second series circuit consisting of gauge 14 and an adjustable balancing resistor $R_e$ is connected in parallel to the first series circuit. The deflection signal is picked up between guages 12 and 13, on one side, and between gauge 14 and resistor $R_e$, on the other. To cancel the twisting component in the outgoing signal, a small resistor $R_c$ is provided in series with gauge 14. In the alternative and as shown in dotted and dashed lines, a large resistor $R_c$ is connected in parallel across gauge 14.

In the embodiment of FIG. 4, a fourth strain gauge 17 is added to the gauges 12, 13 and 14 of FIGS. 1 to 3, inclined on the axis 15 of the bar 1 by an angle opposite to that of gauge 14.

The extensometric bridge of FIG. 5 differs from that of FIG. 3 by replacing resistor $R_e$ with gauge 17, the branches of the bridge containing gauges 14 and 17 including the small series resistor $r_c$ and $r'_c$ or large parallel resistors $R_c$ and $R'_c$.

The embodiment of FIG. 6 differs from that of FIG. 4 by the addition of a second pair of longitudinal gauges 18 and 19, situated, for example, on the same generatrix as but diametrically opposite to gauges 12 and 13, and by the displacement of position of gauge 17 which remains inclined on the axis 15 by an angle opposite to that of gauge 14.

The extensometric bridge of FIG. 7 used with the arrangement of FIG. 6 contains three series circuits mounted between the power terminals S, S'. These series circuits are a circuit containing longitudinal gauges 12 and 13, a circuit containing longitudinal gauges 18 and 19, and a circuit containing inclined gauges 14 and 17, each associated with a small correction resistor $r_c$ and $r'_c$ in series (or with a large parallel resistor), the outgoing signal being picked up between the terminal common to gauges 12 and 13 and the terminal common to gauges 14 and 17, an adjustable correction resistor $R''_c$ being in parallel with the terminals picking up the outgoing signal, and another adjustable correction resistor $R'''_c$ being provided between the terminal common to gauges 18 and 19 and the terminal common to gauges 14 and 17. In practice, only one of the resistors $R''_c$ or $R'''_c$ is used and its circuit can then be controlled, for example, by a switch.

It will be evident to one skilled in the art that other bridge arrangements are possible.

The relative positions of the longitudinal and inclined gauges on the bar 1 are not generally decisive. For example, an inclined gauge could be glued on the bar at the same time as a longitudinal gauge to form a double-crossed gauge.

In each of the embodiments described above, only one strain bar is used and the measurement errors induced by the longitudinal gauges on the twisting of the bar are eliminated by the inclined gauge or gauges.

Although single-gauge assemblies and a bar of constant section have been described, other embodiments are possible.

Thus, the bar may have a variable cross-section. That cross-section could even vary from one zone of measurement of the bending moment to the other, the correction then being made in the extensometric bridge, adapted for that purpose, so that the signals originating from the two assemblies sensitive to bending will be the same. It is also possible to provide several gauges per measurement unit.

What is claimed is:

1. A weight measuring apparatus comprising:
   a support base;
   a load receiving plate;
   a single bar including opposite ends, one end being connected to said load receiving plate, and the opposite end being connected on said support base;
   at least two first strain gauge means fastened to the bar for producing a first signal corresponding to bending of the bar due to an applied load;
   at least one second strain gauge means fastened to the bar for producing a second signal corresponding to twisting of the bar due to the applied load; and
   means for combining the first and second signals produced by said first and second strain gauge means to eliminate a component of said first signal resulting from deformation of the bar due to torsion.

2. Apparatus according to claim 1, wherein said at least two first strain gauge means include identical strain gauges operating together with the bar in zones of the same section of the bar.

3. Apparatus according to claim 1, wherein the bar is of uniform cross-section.

4. Apparatus according to claim 2, wherein the bar is of uniform cross-section.

5. Apparatus according to claim 1, wherein the cross-section of the bar is variable.

6. Apparatus according to claim 2, wherein the cross-section of the bar is variable.

7. Apparatus according to claim 1, wherein said at least two first strain gauge means and said at least one second strain gauge means each include a single strain gauge, the gauge of each first strain gauge means being positioned parallel to the general longitudinal direction of the bar and the gauge of each second strain gauge means being attached to the bar at an incline to said general longitudinal direction.

8. Apparatus according to claim 2, wherein said at least two first strain gauge means and said at least one second strain gauge means each include a single strain gauge, the gauge of each first strain gauge means being positioned parallel to the general longitudinal direction of the bar and the gauge of each second strain gauge means being attached to the bar at an incline to said general longitudinal direction.

9. Apparatus according to claim 7, wherein the angle of incline is 45°.

10. Apparatus according to claim 8, wherein the angle of incline is 45°.

11. Apparatus according to claim 7, comprising two longitudinal gauges on the same line parallel to said general longitudinal direction.

12. Apparatus according to claim 8, comprising two longitudinal gauges on the same line parallel to said general longitudinal direction.

13. Apparatus according to claim 1, wherein there are four first strain gauges means.

14. Apparatus according to claim 2, wherein there are four first strain gauges means.

15. Apparatus according to claim 1, wherein there are two separate second strain gauges means tilted with respect to the general longitudinal direction of the bar at opposite angles.

16. Apparatus according to claim 2, wherein there are two separate second strain gauges means tilted with respect to the general longitudinal direction of the bar at opposite angles.

17. Apparatus according to claim 11, wherein there are two separate second strain gauges means tilted with respect to the general longitudinal direction of the bar at opposite angles.

18. Apparatus according to claim 12, wherein there are two separate second strain gauges means tilted with respect to the general longitudinal direction of the bar at opposite angles.

19. Apparatus according to claim 13, wherein there are two separate second strain gauges means tilted with respect to the general longitudinal direction of the bar at opposite angles.

20. Apparatus according to claim 14, wherein there are two separate second strain gauges means tilted with respect to the general longitudinal direction of the bar at opposite angles.

21. Apparatus according to claim 1, wherein said means for combining includes a circuit of the extensometric bridge type including a first branch with at least two first strain gauge means connected in series and a second branch with at least one second strain gauge means, and said second branch being connected in parallel with said first branch.

22. Apparatus according to claim 2, wherein said means for combining includes a circuit of the extensometric bridge type including a first branch with at least two first strain gauge means connected in series and a second branch with at least one second strain gauge means, and said second branch being connected in parallel with said first branch.

23. Apparatus according to claim 1, wherein said load receiving plate includes a plate and a supporting structure integrally connected with one end of the bar for supporting said plate.

24. Apparatus according to claim 2, wherein said load receiving plate includes a plate and a supporting structure integrally connected with one end of the bar for supporting said plate.

25. Apparatus according to claim 3, wherein said uniform cross-section is polygonal.

26. Apparatus according to claim 3, wherein said uniform cross-section is curved.

27. Apparatus according to claim 3, is of the class of profiles comprising the shape of T, H, I or U.

28. Apparatus according to claim 2, wherein said bar is solid.

29. Apparatus according to claim 2, wherein said bar is hollow.

30. Apparatus according to claim 3, wherein said bar is solid.

31. Apparatus according to claim 3, wherein said bar is hollow.

32. Apparatus according to claim 21, wherein said second branch includes a corrective resistor in series with a second strain gauge means.

* * * * *